United States Patent [19]
Gardner

[11] Patent Number: 5,601,155
[45] Date of Patent: Feb. 11, 1997

[54] JOURNAL BEARING USING DISK FOR TRANSPORTING LUBRICANT

[75] Inventor: Willis W. Gardner, Waukesha, Wis.

[73] Assignee: Delaware Capital Formation, Inc., Waukesha, Wis.

[21] Appl. No.: 498,325

[22] Filed: Jul. 5, 1995

[51] Int. Cl.[6] .................................................. F01M 1/00
[52] U.S. Cl. ........................................ 184/11.2; 184/13.1
[58] Field of Search .................................. 184/11.1, 11.2, 184/11.5, 13.1, 70

[56] References Cited

U.S. PATENT DOCUMENTS

| | | | |
|---|---|---|---|
| 598,013 | 1/1898 | Scheffer | 184/11.2 |
| 874,883 | 12/1907 | Clarke | 184/11.2 |
| 1,019,645 | 3/1912 | Holdsworth | 184/11.2 |
| 1,143,307 | 6/1915 | Noyes | 184/11.4 |
| 1,230,815 | 6/1917 | Smith | 184/11.4 |
| 3,294,457 | 12/1966 | Johnson . | |
| 3,777,851 | 12/1973 | Mitchell et al. . | |
| 4,541,737 | 9/1985 | White | 184/11.4 |
| 5,404,964 | 4/1995 | Zinsmeyer | 184/6.12 |

OTHER PUBLICATIONS

W. W. Gardner, "Bearing Oil Delivery by Disk Scraper Means" ASME, J. Lubr. Tech. p. 174 (1977).
C. M. Mc. Ettles, et al. "Some Characteristics of the Disk Scraper Oil Feed Mechanism" Am. Soc. Lubr. Engr. 34th ASLE Meeting (1979).

*Primary Examiner*—Thomas E. Denion
*Attorney, Agent, or Firm*—Ryan, Maki, Mann & Hohenfeldt

[57] ABSTRACT

A journal bearing is lubricated with a disk on the shaft which sweeps through oil in a sump for picking up oil and transporting it upwardly in the direction of rotation of the disk to above an oil inlet for a bearing where it is scraped off the disk and caused to flow into the bearing. After a segment of a disk emerges from the oil sump, the disk enters a shroud which has a channel-shaped cross-section and whose back wall at least is curved with a decreasing radius as it extends away from the sump toward the scraper. The shroud captures the oil which would otherwise be spun off of the disk at high speeds so the maximum quantity of oil is retained on the disk when it reaches the scraper. A new scraper design is also disclosed.

11 Claims, 5 Drawing Sheets

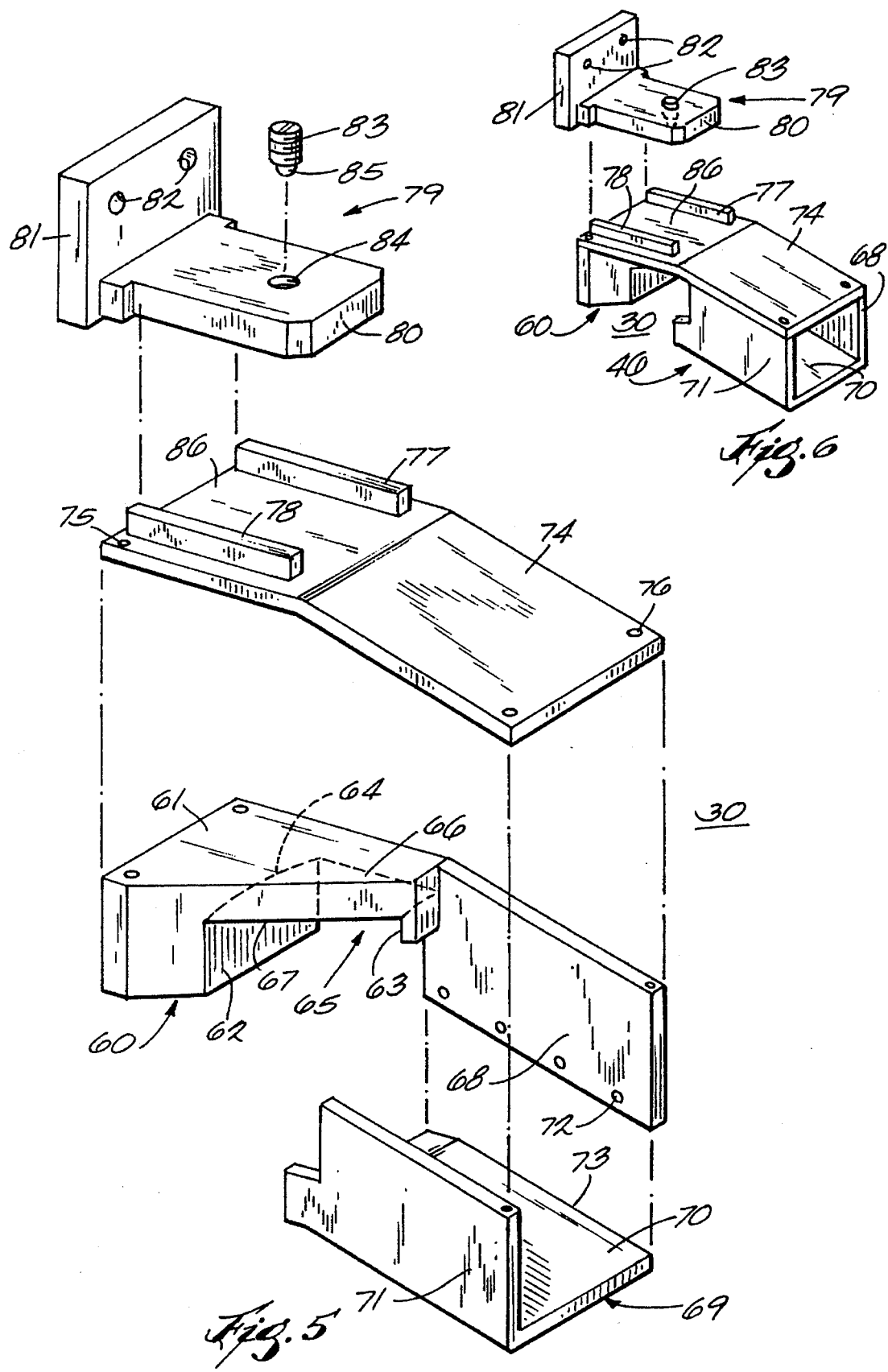

JOURNAL BEARING USING DISK FOR TRANSPORTING LUBRICANT

BACKGROUND OF THE INVENTION

The invention disclosed herein pertains to apparatus for lubricating a journal bearing with a disk mounted concentrically to a shaft wherein the disk rotates through oil in a sump and transports the oil to a level above the bearing where the oil is scraped from the disk and directed into the bearing for lubricating it.

Experience has shown that in conventional disk lubricated journal bearings, the disk transports sufficient oil to lubricate a large journal bearing at rotational speeds of 30 rpm or even less. As rotational speed of the shaft increases, even more oil is transported and the journal is assuredly well-lubricated. But, in some designs, when the rotational speed of the shaft increases substantially, such as to over 130 rpm, the amount of oil delivered to the bearing actually decreases because so much more oil is centrifuged from the disk before the oil carried by the disk can get to the scraper where it is to be diverted to the bearing. At high shaft speeds, the oil is spun from the disk against the interior surface of the bearing housing. In machines, such as two pole alternators which run at 3600 rpm, disk-lubricated bearings are not ordinarily used. Instead, the usual practice is to provide a forced feed lubrication system in which a pump forces oil into the bearing, and the oil is cooled before it is recirculated to the bearing. The tendency is to resort to force feeding of lubricant when shaft rotational speeds exceed several hundred rpm. It is evident that it would be desirable if disk lubrication could be used for speeds substantially greater than 300 rpm to avoid the high cost of a forced lubrication system.

U.S. Pat. No. 3,294,457 describes a self-lubricating bearing that purports to increase the amount of oil that is carried by the disk at higher shaft rotational speeds by having the disk rotate in a semi-circular channel member which has an open top terminating at about the level of the parting line between the upper and lower bearing halves or shells. The lower curved end of the channel is immersed below the oil level in a sump and, although it is not evident that there are openings in the channel for oil to enter, they are likely to be present. The semi-circular channel is concentric with the lower half of the disk. One problem with the arrangement is that one-half of the disk is within the open space of the bearing housing so oil that is centrifuged from the disk at high shaft speeds is not restored to the disk for being scraped off and fed to the bearing. It appears that even though more oil may be held on the disk for part of its revolution, there is little assurance that there will be any more oil on the disk when it reaches the scraper as would be the case if the disk did not rotate through the semi-circular channel.

U.S. Pat. No. 3,777,851, illustrates another disk lubricated bearing in which the problem of oil flow decreasing as disk speed increases is attempted to be solved. In this patented design, the disk and ring that rotates with the shaft has a plurality of cells arranged so as to dip successively into an oil sump and receive charges of oil which are carried to a level above the shaft for gravity discharge into an oil infeed port for the bearing. In this design, the disk is relied upon to provide adequate lubricant when shaft speeds are increased above a certain value.

Several different kinds of scrapers for scraping oil from the periphery of rotating oil transport disk have been tested as reported in a paper presented at the 34th Annual Meeting of the American Society of Lubrication Engineers (1979. The citation is: C.M.Mc.C. Ettles, W. R. Adamson and M. Yiaellouros, *"Some characteristics of the Disk-Scraper Oil-Feed Mechanism,"* Imperial College of Science and Technology, London SW7 2BX, United Kingdom. In the testing apparatus, the authors positioned a straight vertical plate in juxtaposition with and spaced from a vertical line of tangency relative to the lower semi-circular half of the oil transport disk.

Approximately the lower one-half of the plate is immersed in the oil in a sump as is the lower one-half of the disk. The upper half of the plate extends out of the oil in the sump and the top edge of the plate extends up to the level of the horizontal axis of rotation of the shaft. The authors report that the plate gave a slight improvement in the oil transported by the disk.

In accordance with the present invention, the periphery of the oil transport disk rotates between the sidewalls of a shroud whose lower end dips into the oil sump and whose back wall, which bridges the space between the sidewalls, is curved. The curvature is eccentric relative to the disk and the back wall of the shroud converges toward the top of the disk where the oil is scraped from the periphery of the disk. Use of the shroud results in a dramatic increase in the amount of oil carried on the disk's periphery up to the scraper.

SUMMARY OF THE INVENTION

An objective of the present invention is to provide a disk-type bearing lubricator that can provide a sufficient quantity of oil for safe and cool lubrication at higher shaft rotational speeds than would have been considered permissible heretofore.

Another objective of the invention is to provide an improved scraper for removing oil from the rotating disk and directing it to the bearing infeed port.

According to the invention, an oil transporting disk is mounted concentrically to a journal shaft that rotates about a horizontal axis. There is an oil sump in the bottom region of the bearing housing. The lowest part of the disk rotates through the oil and emerges. Immediately, after a given portion of the disk emerges from the oil in the sump, the disk enters between the side walls of a channel-shaped oil capturing and restoring device that is curved in the direction of rotation of the disk. The device will be called a "shroud" for the sake of brevity in this specification. The shroud is closed at its back to define the channel. There is clearance between the sides of the disk and the opposite inside surfaces of the curved shroud. The radius of curvature of the back wall of the shroud decreases somewhat above the sump and toward its upper end where the ! oil is scraped from the disk for being directed to the infeed port of the bearing. The taper or reduction in the radius of the shroud as it proceeds toward the scraper causes any oil that is spun from the disk to return to the disk and be captured so that by the time the periphery of the disk reaches the place where it is scraped, the oil thickness on the periphery of the disk is maximized.

How the foregoing objectives and other more specific objectives and features of the invention are achieved will appear in the ensuing more detailed description of a preferred embodiment of the invention which will now be set forth in reference to the drawings.

DESCRIPTION OF THE DRAWINGS

FIG. 1 is a vertical sectional view of the bearing housing, the new oil shroud, the shaft, and an oil scraper and a view of the oil transport disk mounted on the shaft;

FIG. 5 is an exploded view of the oil scraper assembly;

FIG. 6 is a perspective view of the oil scraper assembly inconjunction with its anti-rotation bracket;

FIG. 7 is a vertical sectional view of the scraper assembly showing the oil transporting disk related to it in dashed lines;

DESCRIPTION OF A PREFERRED EMBODIMENT

Figure 2:
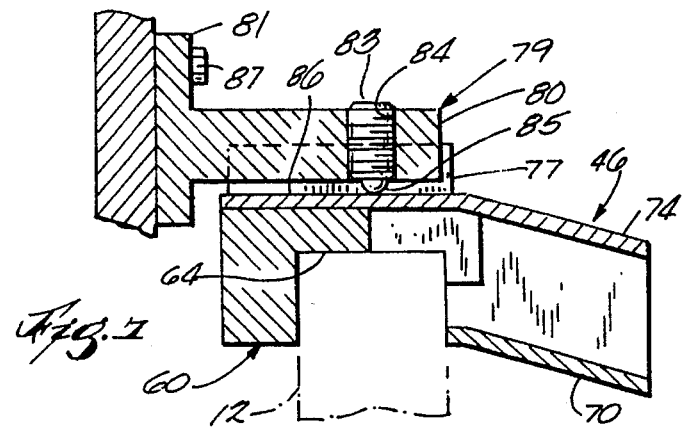
FIG. 2 is a top plan view of the journal bearing structure with the top half of the bearing housing removed.

Much of the journal bearing structure is conventional and will be briefly described. Referring to FIG. 1, the power transmitting shaft is designated by the numeral 10. Dashed lines 11 that are concentric with the shaft are representative of the babbitt layers on the upper and lower bearing halves. The oil transporting disk is fastened to or machined integrally with the shaft and is marked 12. The shaft and disk 12 are enclosed in a housing comprised of an upper part 13 and a lower part 14. As shown in FIG. 2, the lower part 14 of the housing has interconnected cavities such as those marked 15 and 16 constituting an oil containing sump. The level of oil in this particular design is indicated by the line 17 in FIG. 1. It would be permissible for the oil level to be a little lower such as at the level 18 as long as the lower segment of the disk is sufficiently immersed in oil as the disk 12 rotates. FIG. 2 shows the lower half of the journal bearing in section and it is designated generally by the numeral 19. The bearings are faced with babbitt 20 where they interface with the shaft 10. Of course, the lower half of the bearing structure carries most of the! weight of the shaft. The bearing shells are curved at the termination of their lateral extension 21 to provide for some self-alignment of the bearing. As can be seen particularly well in FIGS. 2 and 3, at the front and rear ends of the bearing structure, seals 22 and 23 are provided. These seals prevent oil from leaking out of the bearing structure axially of the shaft periphery. That part of the bearing structure which has been described thus far is conventional.

In FIG. 1 and other FIGURES the new device for scraping the oil from the periphery of the oil transporting disk 12 is designated generally by the numeral 30. The oil scraper will be described in detail later. The new curved oil capturing and restoring shroud is designated generally by the reference numeral 31. The shroud 31 is depicted in FIG. 4 in isolation from the bearing assembly.

Figure 4:
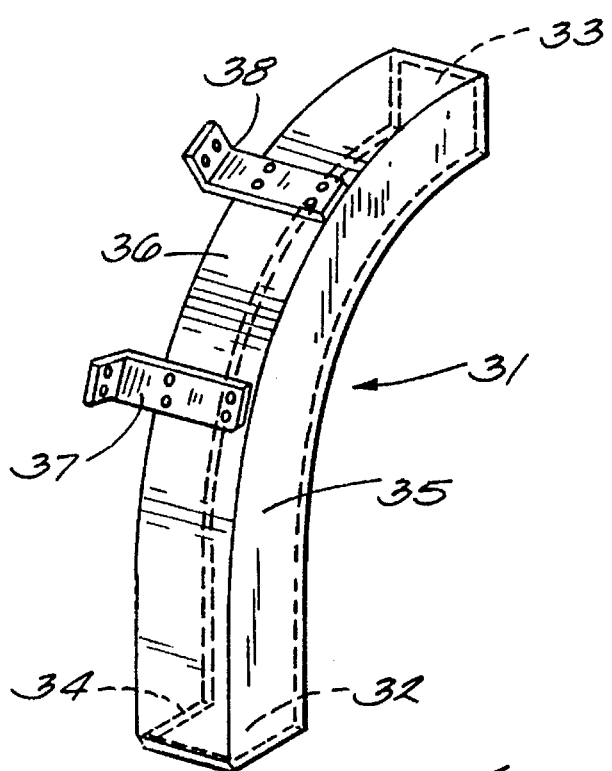
FIG. 4 is a perspective view of the new curved channel oil shroud as viewed from its rear side.

FIG. 4 shows that the shroud 31 is a channel-shaped member that has a lower open end 32 and an upper open end 33. The shroud is comprised of two side walls 34 1and 35 and a rear wall 36. Two mounting brackets 37 and 38 are fastened to the shroud. As shown in FIG. 1, the brackets are mounted by means of screws, such as the one marked 39 to a rib 40 in the upper part of the bearing housing. As shown in FIG. 1, since the radius of the curvatures of the back wall 36 of the shroud and the periphery of disk 12 are not equal, there is an eccentricity that results in the gap between the periphery of the shroud near the lower end region 41 converging to a much smaller gap 42 near the open end 33 of the shroud. As mentioned earlier, at low shaft 10 rotational speeds, enough of an oil layer adheres to the periphery of the disk 12 for being scraped off to adequately lubricate and cool the bearings. At high shaft rotational speeds, however, in conventional designs, lubricant that is picked up by the disk passing beneath oil level 17 could be mostly spun off of the disk, leaving an inadequate layer to be scraped off the disk periphery by the scraper 30 for feeding the bearing. Of course, in the new design disclosed herein oil will be spun off or be centrifuged from the rapidly rotating disk 12 and will land on the back wall 36 of the shroud. Since only so much oil could adhere to the back wall 36, some of the oil will drip off and replenish that which has been spun off of the disk. Moreover, in accordance with the invention, the gap between the periphery of the disk 12 and the rear wall 36 of the shroud is converging thereby trapping the oil that is otherwise spun off of the disk, so the oil layer becomes quite thick in the region marked 42 near the open top end 33 of the shroud.

Figure 3:
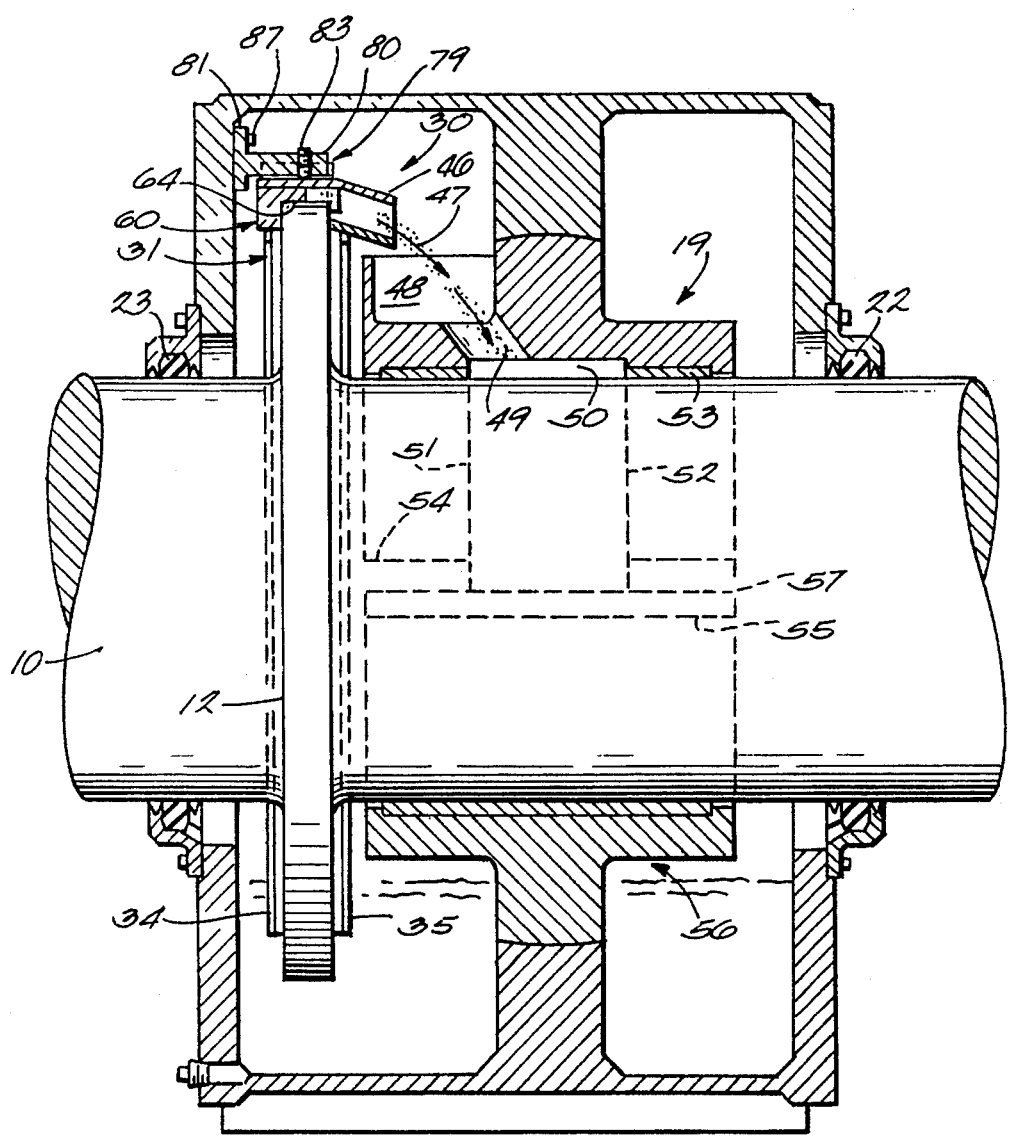
FIG. 3 is a vertical section taken on a line corresponding with 3—3 in FIG. 1.

Attention is now invited to FIG. 3. Here, one may see that the scraper 30 is provided with a chute 46 from which the oil scraped from the periphery and partially from the sides of the oil transporting disk 12 spills in the direction of the arrow 47 into a reservoir 48. The oil from reservoir 48 drains by gravity through an oil entrance port 49 to a cutaway or semi-circular channel 50 formed in the upper bearing structure 19. This arrangement provides for the oil to flow along the semi-circular path defined by the side walls 51 and 52 of the channel 50 that is cut away from the upper bearing sector 19. Of course, the babbitt shown in cross-section on the bearing and marked 53 remains. The oil flows down the passageway defined by lines 51 and 52 where it intersects with an axially extending groove 54 which constitutes an oil distributor assuring that oil will flow along the length of the journal bearing. There is a similar shallow groove 55 in the lower bearing half 56 which joins axially extending distribution groove 54 at the parting line 57 of the upper 19 and lower 56 bearing halves. Observe in FIG. 3 that the spacing between the sides of the oil transport disk 12 and the walls 34 and 35 of the shroud 31 is relatively small which aids in keeping the oil trapped in the shroud until maximum convergence of the shroud occurs at its upper end outlet opening 33.

Attention is now invited to FIGS. 5 and 6 primarily for a more detailed description of how the new scraper for scraping the oil off the periphery of disk 12 is constructed. The scraper is designed to ride on the periphery of the oil transporting disk 12 and bear on the periphery with its own weight. The main scraping component in FIG. 5 is indicated generally by the reference numeral 60. It comprises a body 61 in which there is a slot defined between vertical surfaces 62 and 63. The distance between surfaces 62 and 63 is just a little greater than the distance required for the width of the disk to pass through the slot. The dashed line 64 on wall 62 indicates that the wall has a radius substantially equal to the radius of the disk 12. The gap 65 through which the disk rotates, is covered by a portion 66 of the body which has an edge 67 that is angulated laterally of the width of the disk 12. It is the edge 67 that scrapes the oil from the rotating disk 12. Body 60 has an extension wall 68 that is formed integrally with the body 60. An L-shaped member 69 having a bottom wall 70 and an upstanding front wall 71 is adapted to be fastened by means of screws passing through holes 72 to the edge 73 of the L-shaped member such that the walls 68, 71, and bottom wall 70 form the sides and bottom of the oil spillway chute which was identified previously in FIG. 3 with the numeral 46. A top plate 74 is provided with holes such as those marked 75 and 76 for fastening it with screws, not shown, with corresponding holes in body 60. The result is an enclosed chute 46 which is depicted in assembled condition in FIG. 6.

Figure 8:
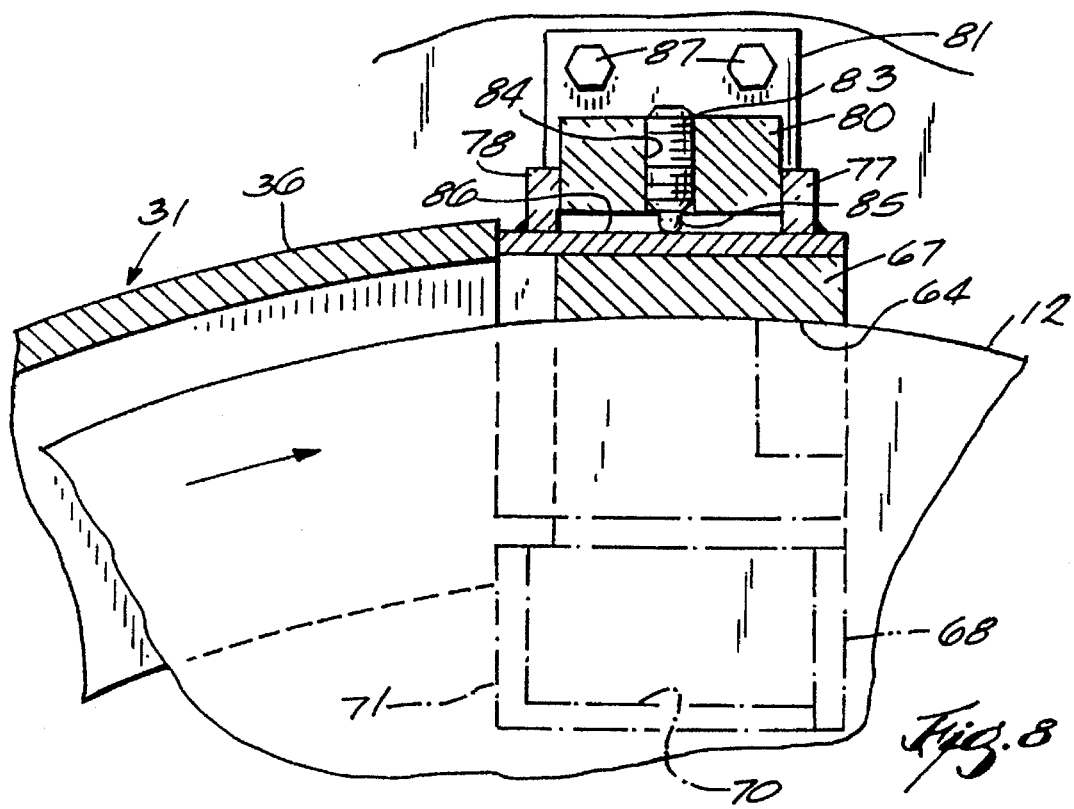
FIG. 8 is a fragmentary view of a part of the oil transporting disk and an elevational view of the oil scraper assembly as viewed from the oil discharge end.

The top plate 74 which participates in forming the chute 46 has two parallel bars 77 and 78 fastened to it. Since the scraper and chute assembly simply rides on the periphery of the oil transporting disk 12, it is necessary to prevent the scraper assembly from being carried rotationally by the disk. Hence, as shown in FIGS. 5 and 6, a bracket 79 having an arm 80 and an upright element 81 fastened to it prevents the scraper from being carried along on disk 12. This results from the arm 80 being fitted between bars 77 and 78. The bracket 79 is provided with two holes 82 for mounting it in the bearing housing. A threaded stud 83 is provided and is adapted for being screwed into a mating threaded hole 84 in arm 80. The stud is hollow and contains a spring, not shown, which exerts a force against a detent ball 85 and the ball bears against the horizontal surface 86 of the scraper cover so as to apply a yieldable force to the scraper relative to the disk 12 in addition to the force that the scraper exerts on the disk by its weight. The scraper unit depicted in FIG. 6 is shown in FIGS. 7 and 8 mounted to the housing rim 40 with machine bolts such as one marked 87. Here, one may see how the detent 85 bears on the top flat surface 86 of the scraper unit.

Figure 10:
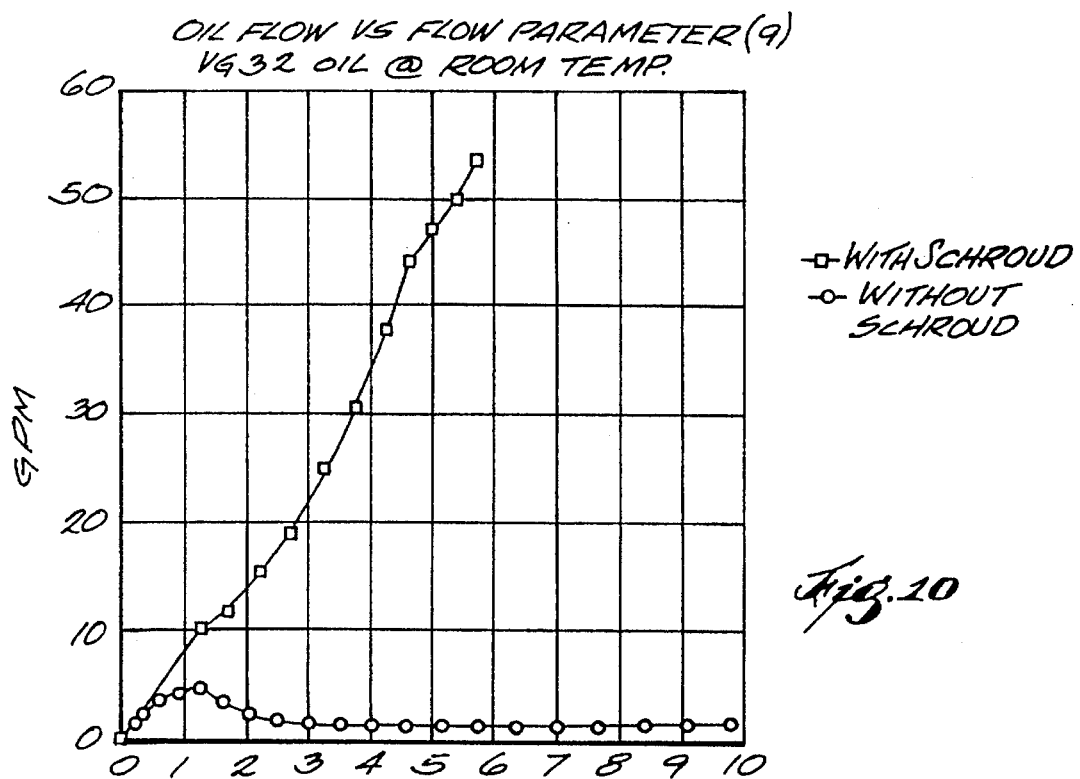
FIG. 10 is a plot of an oil flow parameter (q) versus oil transported by the disk wherein the lower curve represents gallons per minute versus the flow parameter without the new shroud in use and the other plot shows gallons per minute versus flow parameter where the new shroud is in use.
Figure 9:
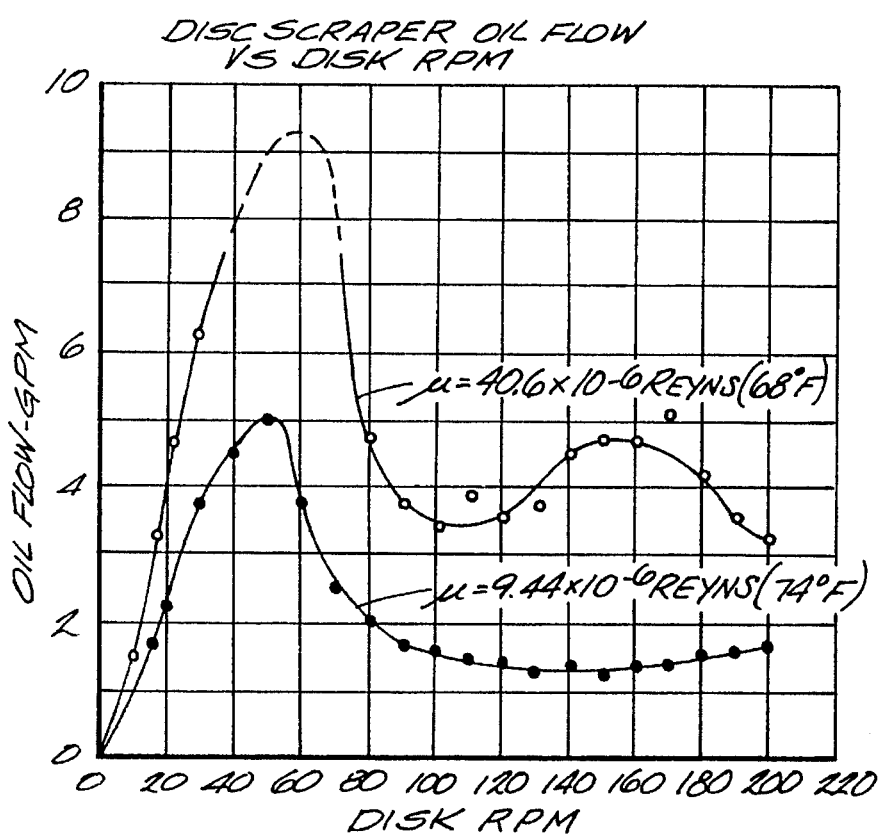
FIG. 9 is a graph showing the relationship of disk revolutions per minute relative to the resulting oil volume carried by the disk for two oils of different viscosities expressed in terms of Reyns.

The FIGS. 9 and 10 graphs are provided for facilitating comparing the quantities of oil delivered by a disk such as disk 12. A parameter "q" has been developed to facilitate such comparisons. The value of "q" is expressed by the following equation:

$$q = b(DN)^{1.5} \times \mu^{0.5} \qquad \text{(Eq. 1)}$$

where q is the comparator parameter;
b = the disk width in inches;
D = the disk dia. in inches;
N = the disk rpm; and
μ = oil viscosity in Reyns.

Equation 1 is presented in a paper, W. W. Gardner, *Bearing Oil Delivery by Disk Scraper Means*, Trans. of the ASME, April 1977, pp. 174–179. The transaction is in the Journal of Lubrication Technology. Equation 1 was developed by fitting a curve to plots of disk rpm and oil flow data for various widths and diameters of the disk and different viscosity lubricants. It turns out that the parameter "q" is a universal parameter for comparing the oil quantities transported by various disks.

The curves in FIG. 9 represent oil flow expressed in gallons per unit (GPM) plotted against disk rpm. In this example, the axial width is 5 inches (127 mm) and the outside diameter of the disk was 37 inches (940 mm). The lower curve in FIG. 9 represents data taken when the disk was transporting a relatively light or low viscosity oil whose viscosity, μ, is specified in Reyns. The upper curve represents data taken with the same disk as the lower curve, except that the oil being transported by the disk has a higher viscosity than the oil used for getting the data for the lower curve. The data for the lower curve of the two curves in FIG. 10 were obtained in a situation where the disk was not rotating through the shroud 31.

To illustrate use of the parameter "q" equation for comparing disk performance, with all pertinent factors taken into consideration, the equation can be satisfied by taking any point on the lower curve in FIG. 9. For illustration purposes just one of the points on the lower curve in FIG. 9 such as the point where the disk is rotating at 80 rpm and the oil flow is two gallons per minute is chosen. The width of the disk is known and so is the outside diameter which, as mentioned above in this case are 5 inches (127 mm) and 37 inches (940 mm), respectively. At 80 rpm, oil flow is 2 gallons (7.6 liters) per minute. Since all quantities in the right side of the equation for the particular point at a disk rotational speed of 80 rpm are known, the value of "q" is calculated to equal 2473.965. For the sake of plotting this value in FIG. 10, "q" is divided by 1000 to yield 2.473. The "q" values for a relatively large number of points on the lower curve in the FIG. 9 have been calculated and plotted as the lower curve in FIG. 10. The values of "q" for the lower curve in FIG. 9 which are plotted in FIG. 10 are represented in that FIGURE having the data points indicated by circles. Thus, one may see in FIG. 10 the gallons-per-minute transported by the disk as represented by the parameter "q". For the one example of disk rotational speed of 80 rpm and 2 gallons (7.6 liters) per minute in FIG. 9 one may see in FIG. 10 that at a point where "q" equals about 2.473 as calculated above that the gallons-per-minute also equals to as in FIG. 9. In FIG. 10, for the upper curve whose data points are indicated by squares, data were taken with a disk having a width of 2.5 inches (64 mm) and an outside diameter of 25 inches (635 mm). In this case, the disk 12 rotated in the new oil capturing and restoring shroud 21. The data obtained initially would result in a plot similar to the plot in FIG. 9 but the data were converted to their equivalent "q" parameter values and plotted in FIG. 10. A steep slope of the upper curve where the shroud 31 was used demonstrates a dramatic increase in the amount of oil transported by the disk when it cooperates with the shroud 31.

One may see in respect to either of the curves in FIG. 9, that in using traditional methods, that is, operating the disk without using applicant's shroud, disk rpm increases up to a point, and oil flow increases almost linearly. There is a point where there is actually a drop off of the quantity of oil transported by the disk as disk rotational speed increases. This is due primarily to the oil being centrifuged off the higher rotational speed disk. Consequently, when the "q" values of the lower curve in FIG. 9 were plotted as the lower curve in FIG. 10, one may see that there is a peak of the "q" value in FIG. 10 corresponding to disk rpm of about 50 in FIG. 9 where oil flow peaked at 5 gallons (19 liters) per minute.

Although an embodiment of the invention has been described in considerable detail, such description is intended to be illustrative rather than limiting, for the invention may be variously embodied and is to be limited only by interpretation of the claims which follow.

I claim:

1. Apparatus for supplying lubricating oil to the interface of the journal on a shaft and a bearing for the journal, comprising:

a housing and a bearing supported in the housing, a shaft extending through the housing and the bearing, the housing having a sump for containing oil arranged below the level of the shaft, an oil transport disk having a peripheral surface, the disk being fixed on the shaft and having a diameter sufficiently large for a segment of the disk below the shaft to be immersed in the oil in the sump as the disk rotates with the shaft, a scraper unit mounted in the housing adjacent the disk at a place substantially opposite of the oil level for scraping off oil that clings to the disk from said peripheral surface for the oil to be fed to the bearing, an oil capturing shroud in the housing and comprised of axially spaced apart side walls and a rear wall defining a channel-shaped cross-sectional configuration having an open side opposite of the rear wall through which a part of the disk after having emerged from the oil in the sump extends as the disk rotates with the shaft, said oil capturing shroud having a lower end portion extending into said oil from about the level of the oil in said sump and having an end portion extending to said scraper unit.

2. Apparatus for supplying lubricating oil to the interface of the journal on a shaft and a bearing for the journal, comprising:

a housing and a bearing supported in the housing, a shaft extending through the housing and the bearing, the housing having a sump for containing oil arranged below the level of the shaft, an oil transport disk fixed on the shaft and having a diameter sufficiently large for a segment of the disk below the shaft to be immersed in the oil in the sump as the disk rotates with the shaft, a scraper unit mounted in the housing adjacent the disk at a place substantially opposite of the oil level for scraping off oil that clings to the disk for the oil to be fed to the bearing, an oil capturing shroud in the housing and comprised of axially spaced apart side walls and a rear wall defining a channel-shaped cross-sectional configuration having an open side opposite of the rear wall through which part of the disk after having emerged from the oil in the sump extends as the disk rotates with the shaft, said oil capturing shroud extending from about the level of the oil in said sump to said scraper unit, and at least a section of said rear wall of the oil capturing shroud is curved and is eccentric relative to the periphery of the disk such that the space between the rear wall and said periphery decreases in the direction in which the disk rotates to the scraper unit.

3. The apparatus according to any one of claims 1 or 2 wherein the width of the disk is sufficiently smaller than the distance between said side walls of the oil capturing shroud for clearance to exist between the disk and the side walls, respectively.

4. The apparatus according to claim 2 wherein said rear wall begins its curvature at about where a horizontal plane would intersect the axis of the disk and said oil capturing shroud simultaneously.

5. The apparatus according to claim 4 wherein the radius of curvature of said rear wall is at a minimum at the scraper unit but is still greater than the radius of said disk.

6. The apparatus according to any one of claims 1, 2, 4 or 5 wherein said bearing is composed of an upper part having a semicircular bearing surface for interfacing with the upper semi-circular half of said shaft at said journal and a lower part having a semi-circular bearing surface for interfacing with the lower semi-circular half of said shaft at said journal, the two halves meeting at a parting line, said upper part of said bearing having a reservoir into which oil scraped from the disk flows, said reservoir having a port for conducting oil from the reservoir to the upper half of the bearing, said upper part having in its surface that interfaces with said upper half of the journal a circumferentially directed groove in communication with said port for conducting oil toward said parting line, and at least said upper half of the bearing having an axially extending distribution groove in the bearing surface contiguous with said parting line and intersected by said groove for distributing oil axially of the journal.

7. The apparatus according to claim 6 wherein said lower half of said bearing has an axially extending distribution groove in said bearing surface joined with the distribution groove in the upper half for augmenting distribution of the oil axially of the journal.

8. The apparatus according to any one of claims 1, 2, 4 and 5 wherein said scraper unit comprises:

a body having generally vertically extending nominally front and rear surfaces spaced from each other and having vertically spaced apart top and bottom surfaces, the body having a passageway formed in it, the passageway having a width at least large enough for the periphery of the oil transport disk to rotate through the passageway, the height of the passageway measured from said bottom surface is less than the distance between said top and bottom surfaces to thereby result in the passageway being closed on top and providing at the end of the passageway into which the disk enters a vertical edge constituting a scraper, said edge being angulated transversely of the periphery of the disk for diverting the oil on the disk to a discharge opening at a side of the passageway.

9. The apparatus according to claim 7 including a chute unconnected to the passageway at said discharge opening for directing the scraped oil to said bearing.

10. The apparatus according to claim 7 including a chute connected to said passageway at said discharge opening for directing the scraped oil to said bearing.

11. A self lubricating journal bearing comprising:

a housing and a journal shaft extending through the housing and a bearing supported in the housing in which the shaft is journaled, an oil sump in the housing in a position below the shaft and an oil transport disk on the shaft, the diameter of the disk being such that a segment of the disk passes through the oil as the shaft rotates and the disk emerges for transporting oil to a place above the bearing, and a scraper unit positioned for scraping oil from the disk when the segment rotates to a level above the bearing, the scraper unit including:

a body having generally vertically extending nominally front and rear surfaces spaced from each other and having vertically spaced apart top and bottom surfaces, the body having a passageway formed in it, the passageway having a width at least large enough for the periphery of the oil transport disk to rotate through the passageway, the height of the passageway measured from said bottom surface is less than the distance between said top and bottom surfaces to thereby result in the passageway being closed on top and providing at the end of the passageway into which the disk enters a vertical edge constituting a scraper said edge being angulated transversely of the periphery of the disk for diverting the oil on the disk to a discharge opening at a side of the passageway.

* * * * *